Figure 5:
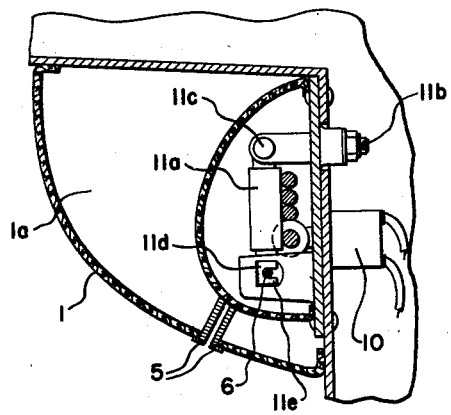

June 13, 1950 P. F. SMITH 2,511,601
AIRCRAFT DECELERATING AND PARACHUTE DEPLOYING MEANS
Filed Nov. 12, 1947 2 Sheets-Sheet 1
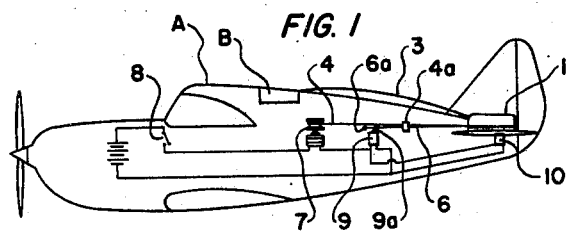
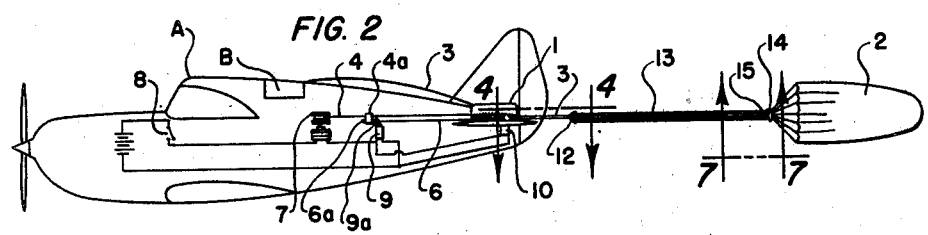
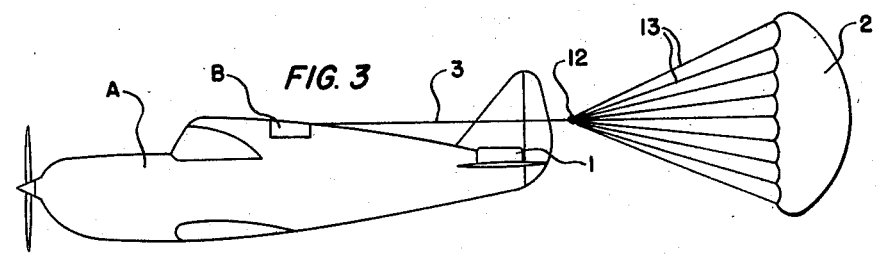
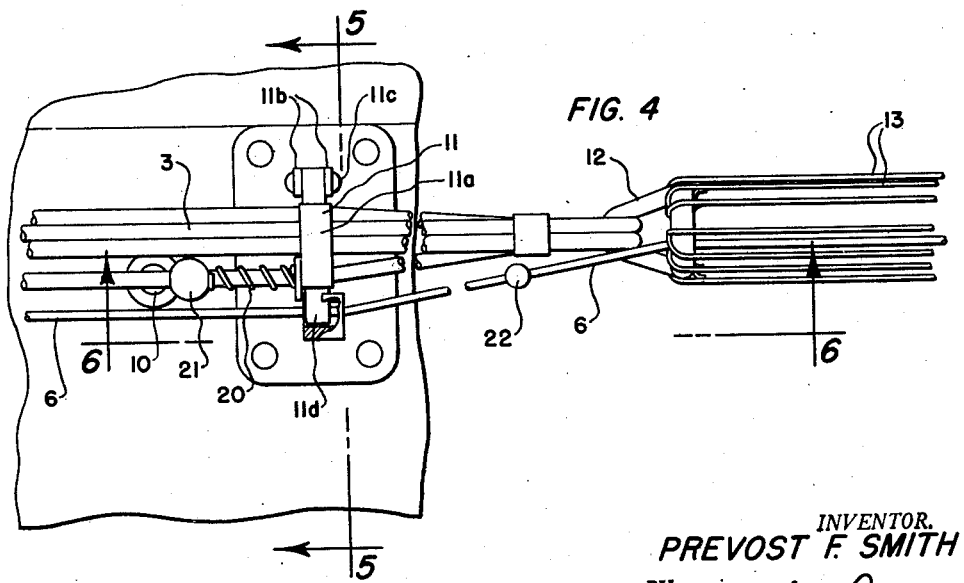
INVENTOR.
PREVOST F. SMITH
BY
AGENT June 13, 1950  P. F. SMITH  2,511,601
AIRCRAFT DECELERATING AND PARACHUTE DEPLOYING MEANS
Filed Nov. 12, 1947  2 Sheets-Sheet 2

INVENTOR.
PREVOST F. SMITH
BY
Wm. H. Dean
AGENT

Patented June 13, 1950

2,511,601

UNITED STATES PATENT OFFICE 2,511,601

AIRCRAFT DECELERATING AND PARACHUTE DEPLOYING MEANS

Prevost F. Smith, San Diego, Calif.

Application November 12, 1947, Serial No. 785,279

14 Claims. (Cl. 244—139)

My invention relates to an aircraft deceleration and parachute deploying means, more particularly for the safe landing of disabled aircraft and the objects of my invention are:

First, to provide a means of this class which is particularly adapted for use in connection with airplanes traveling at high speed for the deceleration thereof and the deployment of a parachute for safely lowering the same.

Second, to provide an aircraft decelerating and parachute deploying means of this class which supplements the structure disclosed in my former patent applications, parachute release Serial No. 637.516 filed December 28, 1945, now Patent No. 2,458,212 of January 4, 1949, parachute deploying means Serial No. 770,509, filed August 25, 1947 now abandoned and parachute deploying means Serial No. 770,508 filed August 25, 1947 now abandoned, for slowing down aircraft traveling at high speed preliminary to the deployment of the main parachute for lowering said aircraft to the ground.

Third, to provide a parachute deploying means of this class in which the shroud lines of the pilot parachute are encircled and permitted to gradually separate in accordance with the deceleration of the aircraft so that the projected area of the pilot parachute is limited to a gradual increase in accordance with the stresses in cables connecting said pilot parachute to the aircraft.

Fourth, to provide an aircraft decelerating and parachute deploying means of this class in which a winch is controlled by a switch operated in connection with the longitudinal deflection of the parachute cables for restraining the pilot parachute so that it opens gradually.

Fifth, to provide an aircraft decelerating and parachute deploying means of this class which may be used in connection with the controlling of disabled aircraft in high speed spins or dives without producing undue shock due to structure of the aircraft or the pilot therein.

Sixth, to provide an aircraft decelerating and parachute deploying means of this class which imposes its initial drag axially of the aircraft whereby said aircraft is automatically brought under control from a spinning condition.

Seventh, to provide a novel means for controlling the gradual opening of a pilot parachute connected to an airplane traveling at high speed.

Eighth, to provide an aircraft decelerating and parachute deploying means of this class which is very simple and economical of construction, efficient in operation and which will not readily deteriorate or get out of order.

Figure 9:
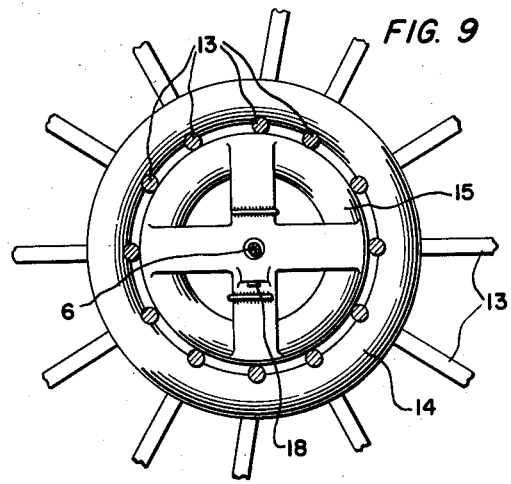
Figure 6:
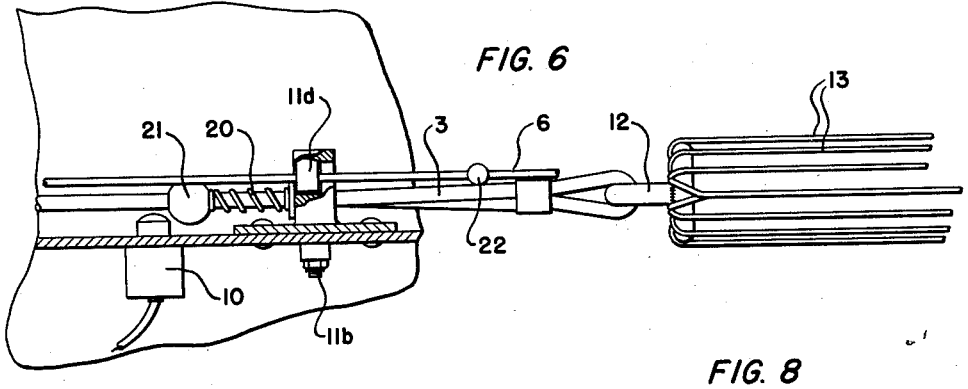
Figure 7:
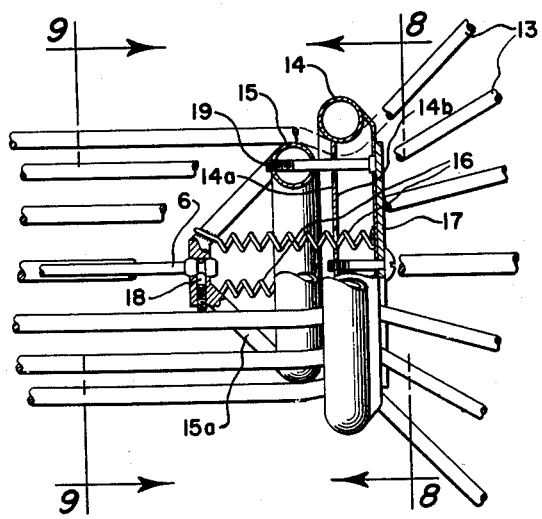
Figure 8:
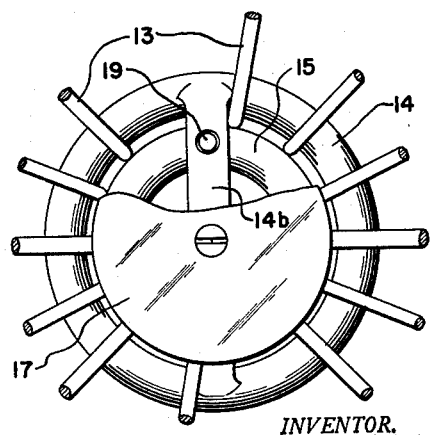

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a side elevational view of an airplane showing my aircraft decelerating and parachute deploying means in connection therewith; Fig. 2 is a similar view to Fig. 1 showing the pilot parachute of my aircraft decelerating and parachute deploying means in partially opened position; Fig. 3 is another similar view to Fig. 1 showing the pilot parachute in fully opened position and imposing drag above the longitudinal axis of the aircraft; Fig. 4 is an enlarged fragmentary plan view taken from the line 4—4 of Fig. 2 showing portions broken away and in section to amplify the illustration; Fig. 5 is a fragmentary sectional view taken from the line 5—5 of Fig. 4; Fig. 6 is a fragmentary sectional view taken from the line 6—6 of Fig. 4 showing portions further broken away and in section to amplify the illustration; Fig. 7 is an enlarged fragmentary elevational view taken from the line 7—7 of Fig. 2 showing portions broken away and in section to amplify the illustration; Fig. 8 is a sectional view taken from the line 8—8 of Fig. 7 and Fig. 9 is a sectional view taken from the line 9—9 of Fig. 7.

Similar characters of reference refer to similar parts and portions throughout the several views of the drawings.

The parachute pack 1, parachute 2, cables 3, zipper cable 4, zipper 5, control cable 6, winch 7, switches 8, 9 and 10, cable gate 11, stirrup 12, parachute shroud lines 13, shroud line engaging rings 14 and 15, springs 16, plate 17, detent 18, guide bolts 19, spring 20, balls 21 and 22 constitute the principal parts and portions of my aircraft decelerating and parachute deploying means.

The parachute pack 1 as shown in Figs. 1 and 5 of the drawings is positioned adjacent the tail group rudder and horizontal stabilizer on one side of said rudder as shown best in Fig. 1 of the drawings. This pack 1 is provided with a compartment 1a in which the parachute 2 is packed when not in operation. The zipper 5 encloses the pack 1 around the parachute 2 and the zipper cable 4 is connected to the zipper tab and this zipper cable 4 is provided with a sleeve 4a fixed thereto slidably mounted on the control cable 6 adapted to abut the ball 6a thereon normally positioned beyond the location of the switch 9 as shown in Fig. 1 of the drawings. The cables 3 interconnect the stirrup 12 secured to the shroud lines 13 of the parachute 2 and the main parachute pack B of the airplane A. This main parachute pack B is disclosed in my former applications for Letters Patent hereinbefore set forth. The zipper cable 4 is wound on the electric winch 7 which is in circuit with the electrical switches 8, 9 and 10 as shown diagrammatically in Figs. 1 and 2 of the drawings. The shroud line engaging rings 14 and 15 are positioned on and around the shroud lines 13 at an initial location very close to the canopy of the parachute 2 as shown best in Fig. 2 of the drawings. These shroud line engaging rings 14 and 15 are forced toward each other by the springs 16 and the shroud lines 13 surround the ring 15 while the ring 14 surrounds the shroud lines 13 in close proximity to the ring 15 as shown best in Fig. 7 of the drawings. Thus, tension applied to the shroud lines 13 by the parachute 2 tending to open, forces the ring 15 toward the ring 14, the inside diameter of which is very close to the external diameter of the ring 15 which prevents any possibility of the ring 15 sliding through the ring 14 due to the thickness of the shroud lines 13. It will also be noted that the bolts 19 fixed to the ring 15 pass through an opening 14a in the cross arm 14b extending diametrically of the ring 14 as shown best in Figs. 7 and 8 of the drawings. The head of the bolt 19 abuts the plate 17 which is fixed at the center of the cross arm 14b and this plate 17 is almost equal in diameter to the inside diameter of the ring 14 whereby the shroud lines 13 are maintained in close proximity to the inner side of the ring 14, all as shown best in Figs. 7 and 8 of the drawings. Secured to the ring 15 by means of the detent 18 at the frame portion 15a of the ring 15, is the control cable 6. This control cable 6 extends past the switch 9 in close proximity thereto and is provided with a ball 6a on the end thereof, engageable by the sleeve 4a on the zipper cable 4, all as shown best in Figs. 1 and 3.

The control cable 6 passes forwardly, inwardly of the shroud lines 13 through the stirrup 12 and the arm 11a of the cable gate 11, as shown best in Figs. 4 and 6 of the drawings. Fixed on the control cable 6 is a ball 22, adapted to engage one side of the arm 11a for pivoting the same on the vertical axis of the bolt 11b which at its upper end is provided with a horizontal hinge pin 11c on which the arm 11a is pivotally mounted. This cable gate 11 is provided with an overhanging portion 11d engaging the upper side of the arm 11a at its end, through which the control cable 6 passes. Thus, the end 11c of the arm 11 is prevented from swinging upwardly on the axis of the pin 11b by the overhanging portion 11 when in the position as shown in Figs. 4 and 6 of the drawings. It will be noted that the overhanging portion 11d is inclined toward its open side and that the arm 11a is provided with a correspondingly inclined angle. Fixed on one of the cables 3, is the ball 21, engaged by the spring 20 surrounding the cable to which the ball 21 is fixed and this cable is abutted to the ball 21 and the arm 11a of the cable gate 11. This ball 21 is adapted to operate the switch 10 and is normally positioned thereover holding said switch 10 closed and when the ball 21 is deflected therefrom as shown in Figs. 4 and 6 of the drawings, the switch 10 is open. It will be noted that the cable gate 11 and the switch 10 are mounted on structure of the horizontal stabilizer of the airplane A and preferably to structure having suitable rigidity to stand lateral stresses of the cables 3 imposed by the parachute 2 when tending to exert upward force as shown in Fig. 3 of the drawings. It will be noted that the control cable 6 passes through the end of the arm 11a of the switch gate 11 and that this arm 11a is provided with a slotted portion 11e open at its normally lower side to permit clearance of the arm 11a from the cable 6 when it pivots upwardly on the axis of the pins 11c in connection with the bolt 11b after the end of the gate arm 11a passes from the overhanging portion 11d of the cable gate 11.

The operation of my aircraft decelerating and parachute deploying means is substantially as follows:

As hereinbefore set forth, it is to be understood that the improvements over my former co-pending patent application involve subject matter designed to bring an airplane traveling at high speed under control so that a main parachute may be deployed and safely lower the aircraft. It is contemplated that my present invention will be used on numerous high speed airplanes traveling in excess of 200 miles per hour and the initiation of the operation of my aircraft decelerating and parachute deploying means may be made at high speeds considerably greater than 200 miles per hour in order to save airplanes which have gone into high speed spins and become uncontrollable in high speed dives. It is obvious that a parachute of sufficient projected area to safely lower an airplane could not be suddenly opened in connection with an airplane when traveling at high speed. If a large parachute of such proportions connected to an airplane should be opened at relatively high speed, the shock load created by the parachute would cause failure of the aircraft structure to which it would be connected. Thus, the primary object of my present invention, is to deploy and gradually open a pilot parachute for slowing down an airplane whereby the drag of the pilot parachute automatically controls the gradual opening thereof so that certain allowable stresses are not exceeded in the slowing down of the aircraft to a speed at which the main parachute may be deployed by the pilot parachute. Referring to Fig. 1 of the drawings, it will be seen that the switch 8 is in the pilot's compartment of the airplane A and that this switch 8 controls the initiation of operation of my aircraft decelerating and parachute deploying means. When this switch 8 is closed by the pilot of the airplane A, the motor of the electric winch 7 is energized causing retraction of the zipper cable 4 which opens the parachute pack 1. The sleeve 4a on the zipper cable 4 passes forwardly and trips the switch 9 by means of its arm 9a which opens the switch 9 and prevents further operation of the electric winch 7 until the switch 10 is closed. It will be noted that after the switch arm 9a of the switch 9 has been thrown, that the sleeve 4a is abutted to the ball 6a on the control cable 6. When the zipper cable 4 opens the parachute pack 1 and the pilot parachute 2 is deployed into a relationship as shown in Fig. 2 of the drawings, the position of the rings 14 and 15 prevents the pilot parachute 2 from opening appreciably until the drag thereon reduces. The initial load imposed by the pilot parachute in its partially opened condition as shown in Fig. 2 of the drawings, causes longitudinal stretch of the cables 3 to a position wherein the ball 21 is deflected from its position in engagement with the switch 10 which causes the switch 10 to be opened, preventing operation of the electric winch 7. When the initial drag of the pilot parachute 2 as shown in Fig. 2 of the drawings has slowed the airplane A to a speed wherein the drag of the pilot parachute 2 is decreased, the contraction of the cables 3 causes the ball 21 to resume its position over the switch 10 at which time the switch 10 is closed, starting operation of the winch 7. The sleeve 4a contacting the ball 6a on the control cable 6, causes steady retraction of the ring 15 and the ring 14 connected thereto by the springs 16 which tend to hold the rings 14 and 15 in positive engaged relationship with the shroud lines 13. It will be noted that the tendency of the shroud lines 13 to spread, causes the ring 15 to be drawn into the ring 14 jamming the shroud lines 13 and preventing further opening of the canopy of the parachute 2 until the control cable 6 forces the ring 15 away from the ring 14 permitting the ring 14 to slide over the shroud lines 13 to permit opening of the pilot parachute 2. It will be here noted that the speed of the electric winch 7 may exceed the desired opening rate of the pilot parachute 2, in which case the load of drag imposed by the pilot parachute 2 again deflects the cables 3 and stretches the same to a position wherein the ball 21 is again removed from the switch 10 opening the same and automatically stopping the operation of the electric winch. Thus, the retraction of the rings 14 and 15 of the shroud lines 13 is accomplished automatically by the drag of the pilot parachute 2 and the winch 7 operates only when such drag is increased to safe limits so that the pilot parachute 2 is opened only at such time as the drag is within the safe limits of the structure to which the pilot parachute 2 is connected. As the rings 14 and 15 are gradually retracted by the control cable 6, in proportion to the deceleration of the aircraft, the ball 22 slowly approaches the arm 11a of the cable gate 11. As the rings 14 and 15 pass near to the stirrup 12 to which the shroud lines 13 are connected, the ball 6 releases the arm 11a of the cable gate 11, permitting the cables 3 to pass upwardly from the horizontal stabilizer as shown in Fig. 3 of the drawings, imposing a drag load above the center of gravity of the airplane A so that the airplane A will be forced into an inclined stall position as set forth in detail in my former co-pending patent applications hereinbefore listed, for the purpose of deploying the main parachute in the main parachute pack B for safely lowering the airplane A. It will be here noted that the control cable 6 is released from the ring 15 by means of the spring loaded detent 18 when the pilot parachute 2 passes upwardly as shown in Fig. 3 of the drawings and releases the main parachute pack B preventing the breaking of said cable 6.

Though I have shown and described a particular combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an airplane decelerating and parachute deploying means of the class described, the combination of an airplane, a parachute pack near the tail surfaces thereof, a means for opening of said pack, a parachute in said pack having extending shroud lines, a pair of concentric rings in connection with said shroud lines, one of said rings surrounding the same, one of said rings internally of the same adjacent the surrounding ring and a cable connected with one of said rings and a winch for gradually retracting said rings from said shroud lines for progressively opening said parachute from a partial position to a full open position.

2. In an airplane decelerating and parachute deploying means of the class described, the combination of an airplane, a parachute pack near the tail surfaces thereof, a means for opening of said pack, a parachute in said pack having extending shroud lines, a pair of concentric rings in connection with said shroud lines, one of said rings surrounding the same, one of said rings internally of the same adjacent the surrounding ring and a cable connected with one of said rings and a winch for gradually retracting said rings from said shroud lines for progressively opening said parachute from a partial position to a full open position, switch means on said airplane associated with the cables connected to said shroud lines whereby longitudinal deflection of said cables opens said switch for controlling said winch preventing said parachute from being opened when imposing a drag load exceeding certain limits.

3. In an airplane decelerating and parachute deploying means of the class described, the combination of an airplane, a parachute pack near the tail surfaces thereof, a means for opening of said pack, a parachute in said pack having extending shroud lines, a pair of concentric rings in connection with said shroud lines, one of said rings surrounding the same, one of said rings internally of the same adjacent the surrounding ring and a cable connected with one of said rings and said winch for gradually retracting said rings from said shroud lines for progressively opening said parachute from a partial position to a full open position, switch means on said airplane associated with the cables connected to said shroud lines whereby longitudinal deflection of said cables open said switch for controlling a winch preventing said parachute from being opened when imposing a drag load exceeding certain limits, a gate engaging said cables connected to said shroud lines, and an obstruction on said cable connected to one of said rings adapted to open said gate after said rings have been moved to a position near the extremities of said shroud lines whereby said gate is automatically opened after said parachute is completely opened permitting said parachute to exert a force above the center of gravity of said airplane for forcing the same into a stall condition.

4. In an airplane decelerating and parachute deploying means of the class described, the combination of an airplane, a parachute pack near the tail surfaces thereof, a means for opening of said pack, a parachute in said pack having extending shroud lines, a pair of concentric rings in connection with said shroud lines, one of said rings surrounding the same, one of said rings internally of the same adjacent the surrounding ring and a cable connected with one of said rings and a winch for gradually retracting said rings from said shroud lines for progressively opening said parachute from a partial position to a full open position, said ring nearest said parachute and surrounding said shroud lines connected to said inner ring, springs tending to hold said rings together whereby said shroud lines are engaged intermediate said outer and said inner rings causing the same to lock together when force is exerted by said parachute on said shroud lines.

5. In an airplane decelerating and parachute deploying means of the class described, the combination of an airplane, a main parachute pack therein, cables in connection with said pack, a pilot parachute connected with said cables at its shroud lines, a winch, a cable extending from said winch, a pair of concentric rings on said shroud lines, one of said rings surrounding said shroud lines the other of said rings positioned concentrically at the inner side of said shroud lines, said cable connected to said winch secured at its other end to one of said rings for progressively forcing said rings longitudinally of the shroud lines of said parachute for gradually opening the same.

6. In an airplane decelerating and parachute deploying means of the class described, the combination of an airplane, a main parachute pack therein, cables in connection with said pack, a pilot parachute connected with said cables at its shroud lines, a winch, a cable extending from said winch, a pair of concentric rings on said shroud lines, one of said rings surrounding said shroud lines the other of said rings positioned concentrically at the inner side of said shroud lines, said cable connected to said winch secured at its other end to one of said rings for progressively forcing said rings longitudinally of the shroud lines of said parachute for gradually opening the same, said outer ring being positioned slightly nearer said pilot parachute than said inner ring.

7. In an airplane decelerating and parachute deploying means of the class described, the combination of an airplane, a main parachute pack therein, cables in connection with said pack, a pilot parachute connected with said cables at its shroud lines, a winch, a cable extending from said winch, a pair of concentric rings on said shroud lines, one of said rings surrounding said shroud lines the other of said rings positioned concentrically at the inner side of said shroud lines, said cable connected to said winch secured at its other end to one of said rings for progressively forcing said rings longitudinally of the shroud lines of said parachute for gradually opening the same, said outer ring being positioned slightly nearer said pilot parachute than said inner ring, the inside diameter of said outer ring being near the outside diameter of said inner ring.

8. In an airplane decelerating and parachute deploying means of the class described, the combination of an airplane, a main parachute pack therein, cables in connection with said pack, a pilot parachute connected with said cables at its shroud lines, a winch, a cable extending from said winch, a pair of concentric rings on said shroud lines, one of said rings surrounding said shroud lines the other of said rings positioned concentrically at the inner side of said shroud lines, said cable connected to said winch secured at its other end to one of said rings for progressively forcing said rings longitudinally of the shroud lines of said parachute for gradually opening the same, said outer ring being positioned slightly nearer said pilot parachute than said inner ring, switch means in connection with said airplane, switch actuating means on said first mentioned cables engageable with said switch means whereby longitudinal deflection of said first mentioned cables causes said switch actuating means to be removed from said switch means causing said switch means to open the circuit to said winch and prevent further opening of said pilot parachute when the drag load thereof exceed certain limits.

9. In an airplane decelerating and parachute deploying means of the class described, the combination of an airplane, a main parachute pack therein, cables in connection with said pack, a pilot parachute connected with said cables at its shroud lines, a winch, a cable extending from said winch, a pair of concentric rings on said shroud lines, one of said rings surrounding said shroud lines the other of said rings positioned concentrically at the inner side of said shroud lines, said cable connected to said winch secured at its other end to one of said rings for progressively forcing said rings longitudinally of the shroud lines of said parachute for gradually opening the same, said outer ring being positioned slightly nearer said pilot parachute than said inner ring, switch means in connection with said airplane, switch actuating means on said first mentioned cables engageable with said switch means whereby longitudinal deflection of said first mentioned cables causes said switch actuating means to be removed from said switch means causing said switch means to open the circuit to said winch and prevent further opening of said pilot parachute when the drag load thereof exceed certain limits, a pack for said pilot for said pilot parachute near the tail surfaces of said airplane, said cable in connection with said winch adapted to progressively open said pilot parachute pack, a switch operated in connection with said cable for shutting off operation of said winch when said pilot parachute is deployed preliminary to the operation of said first mentioned switch.

10. In an airplane decelerating and parachute deploying means of the class described, the combination of an airplane, a main parachute pack therein, cables in connection with said pack, a pilot parachute connected with said cables at its shroud lines, a winch, a cable extending from said winch, a pair of concentric rings on said shroud lines, one of said rings surrounding said shroud lines the other of said rings positioned concentrically at the inner side of said shroud lines, said cable connected to said winch secured at its other end to one of said rings for progressively forcing said rings longitudinally of the shroud lines of said parachute for gradually opening the same, said outer ring being positioned slightly nearer said pilot parachute than said inner ring, switch means in connection with said airplane, switch actuating means on said first mentioned cables engageable with said switch means whereby longitudinal deflection of said first mentioned cables causes said switch actuating means to be removed from said switch means causing said switch means to open the circuit to said winch and prevent further opening of said pilot parachute when the drag load thereof exceed certain limits, a pack for said pilot parachute near the tail surfaces of said airplane, said cable in connection with said winch adapted to progressively open said pilot parachute pack, a switch operated in connection with said cable for shutting off operation of said winch when said pilot parachute is deployed preliminary to the operation of said first mentioned switch, a manual operating switch for initiating operation of said winch.

11. In a decelerating means, the combination of an object movable through the air, a parachute container on said object, means for opening said container, a parachute in said container having extending shroud lines, choke means independent of said object and surrounding said shroud lines in connection with said parachute and means for moving said choke means along said shroud lines away from said parachute for progressively opening said parachute by intermittent movement of said choke means away from said parachute from a partial position to a full open position, said means for moving said choke including a cable deflectable longitudinally of the axis of said parachute.

12. In a decelerating means, the combination of an object movable through the air, a parachute container on said object, means for opening said container, a parachute in said container having extending shroud lines, choke means in connection with said parachute and means for operating said choke means for progressively opening said parachute from a partial position to a full open position, switch means on said projectile associated with the cables connected to said shroud lines whereby longitudinal deflection of said cables operates said switch means for controlling said second mentioned means preventing said parachute from being opened when imposing a drag load exceeding certain limits.

13. In a decelerating means of the class described, the combination of an object movable through the air, a parachute container thereon, means for opening said container, a parachute in said container having extending shroud lines, choke means in connection with said parachute and a winch for operating said choke means for progressively opening said parachute from a partial position to a full open position.

14. In a decelerating means of the class described, the combination of an object movable through the air, a parachute container thereon, means for opening said container, a parachute in said container having extending shroud lines, choke means in connection with said parachute and a winch for operating said choke means for progressively opening said parachute from a partial position to a full open position, switch means on said projectile associated with the cables connected to said shroud lines whereby longitudinal deflection of said cables operate said switch means for controlling said winch preventing said parachute from being opened when imposing a drag load exceeding certain limits.

PREVOST F. SMITH.

REFERENCES CITED

The following references are of record in the file of this patent:

UNITED STATES PATENTS

| Number | Name | Date |
| --- | --- | --- |
| 1,943,292 | Babbitt | Jan. 16, 1934 |
| 1,972,967 | Zahodiakin | Sept. 11, 1934 |
| 2,308,797 | Nasca | Jan. 19, 1943 |